(12) United States Patent
Garran

(10) Patent No.: US 6,905,338 B1
(45) Date of Patent: Jun. 14, 2005

(54) THREE DIMENSIONAL MODEL AND KIT FOR ASSEMBLY OF SAME

(75) Inventor: Joseph F. Garran, Strongsville, OH (US)

(73) Assignee: Vanguard Marketing Group, Inc., Northfield, OH (US)

( * ) Notice: Subject to any disclaimer, the term of this patent is extended or adjusted under 35 U.S.C. 154(b) by 0 days.

(21) Appl. No.: 10/172,613

(22) Filed: Jun. 14, 2002

(51) Int. Cl.[7] .................... G09B 25/04; A63H 33/08; A63H 33/16
(52) U.S. Cl. .................... 434/79; 446/109; 446/110; 446/115; 229/116.4
(58) Field of Search .................. 446/109, 110, 446/115, 112, 79, 80; 434/72, 79, 73, 74, 75, 76, 77, 78, 80; D9/322; D21/510; 229/116.4

(56) References Cited

U.S. PATENT DOCUMENTS

| | | | |
|---|---|---|---|
| 1,393,163 A | | 10/1921 | Rasely |
| 1,648,604 A | * | 11/1927 | Bedington .................. 446/109 |
| 1,742,905 A | * | 1/1930 | Friedel ........................ 446/109 |
| 1,867,374 A | * | 7/1932 | Myers ......................... 446/109 |
| 1,873,748 A | | 8/1932 | Favreau |
| 2,204,264 A | * | 6/1940 | Warren ....................... 446/109 |
| 2,315,463 A | | 3/1943 | Tingley et al. |
| 2,351,931 A | | 6/1944 | Debs |
| 2,408,272 A | * | 9/1946 | Roach ......................... 446/109 |
| 2,556,323 A | * | 6/1951 | Feigelman .................. 446/109 |
| 2,635,359 A | | 4/1953 | Broscious |
| 3,343,297 A | * | 9/1967 | Valentine .................... 446/109 |
| 4,219,961 A | * | 9/1980 | Stiles ........................... 446/85 |
| 4,245,400 A | | 1/1981 | Johnson |
| 4,650,437 A | | 3/1987 | Sitkus |
| 5,002,513 A | | 3/1991 | Weiss |
| 5,088,598 A | | 2/1992 | Iguchi |
| 5,100,002 A | * | 3/1992 | Garran ........................ 206/577 |
| 5,356,151 A | | 10/1994 | Abecassis |
| 5,360,344 A | | 11/1994 | Rishack |
| 5,360,365 A | | 11/1994 | Evans |
| 5,427,530 A | | 6/1995 | Taggart |
| 5,435,518 A | | 7/1995 | Iguchi |
| 5,683,087 A | * | 11/1997 | Henshaw et al. ........... 273/237 |
| 5,865,660 A | * | 2/1999 | Smith ......................... 446/106 |
| 5,975,977 A | | 11/1999 | Choi |
| 6,073,404 A | | 6/2000 | Norfleet |
| 6,299,060 B1 | * | 10/2001 | Garran .................... 229/116.4 |
| 6,581,822 B1 | * | 6/2003 | Garran .................... 229/116.4 |

FOREIGN PATENT DOCUMENTS

FR          2544624 A    * 10/1984   ............. A63F/9/18

OTHER PUBLICATIONS www.robotbooks.com/robot-kits.htm "Scrambler" All Terrain Robot, Aug. 16, 2001.*

* cited by examiner

Primary Examiner—Derris H. Banks
Assistant Examiner—Dmitry Suhol
(74) Attorney, Agent, or Firm—Curatolo Sidoti

(57) ABSTRACT

A three dimensional model comprising a substantially planar base mounting member having opposite top and bottom surfaces; a first building structure adapted to be mounted on a portion of said top surface of said base mounting member, said at least one building structure assembled from a piece of foldable, self-supporting sheet material, said piece of foldable, self-supporting sheet material having fold lines thereon, and when folded along said fold lines forms said building structure; and a second building structure adapted to be mounted on a portion of said top surface of said base mounting member, said at least one building structure assembled from a piece of foldable, self-supporting sheet material, said piece of foldable, self-supporting sheet material having fold lines thereon, and when folded along said fold lines forms said second building structure.

23 Claims, 14 Drawing Sheets

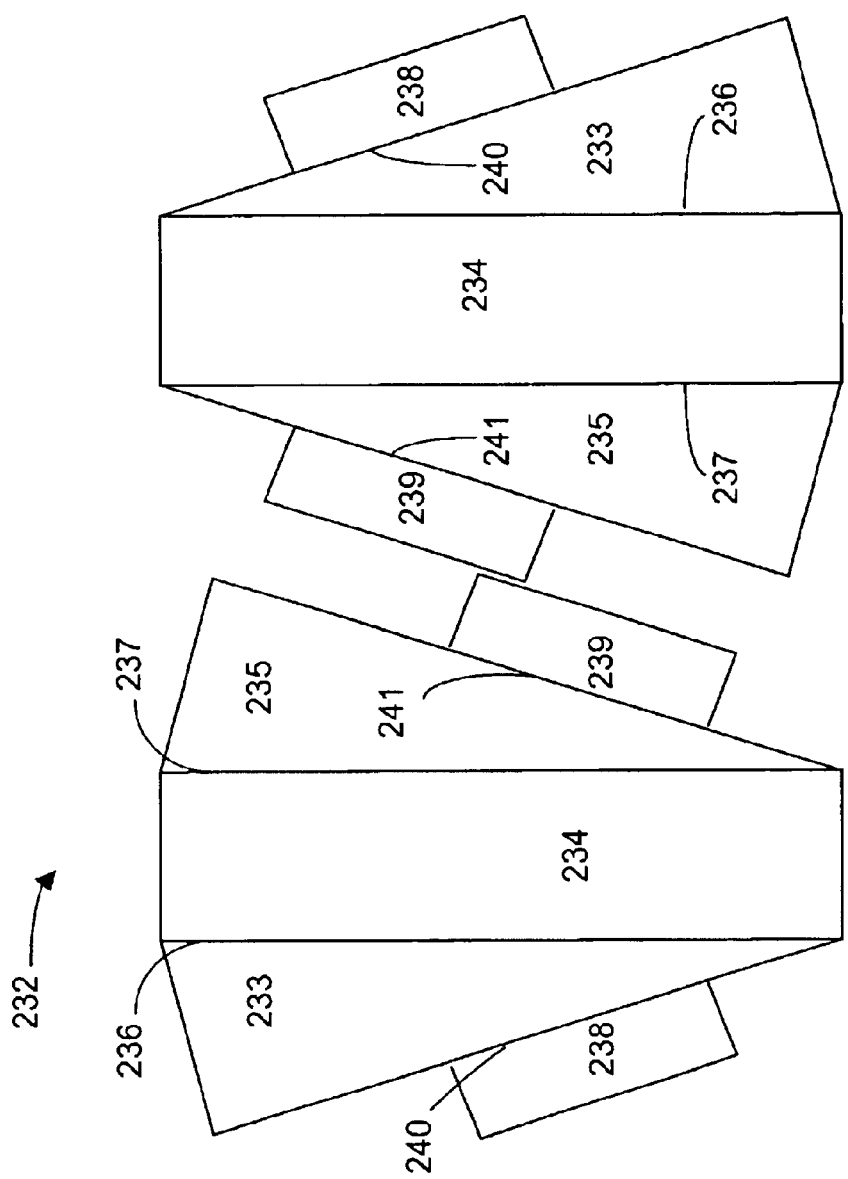

THREE DIMENSIONAL MODEL AND KIT FOR ASSEMBLY OF SAME

TECHNICAL FIELD OF THE VENTION

The present invention relates to a model of a building structure and a model kit for assembly of the model building structure. More particularly, the present invention relates to a three dimensional model of a historical building and model kit for assembly of the model building. The model kit can be used for school projects, hobbies and the like.

BACKGROUND OF THE INVENTION

Model kits are widely used by educators, hobby enthusiasts and the like. The assembly of a model can be used as an educational tool to teach school-age children about the subject matter represented by the model. A model builder, such as the school-age child, would quickly lose interest in the model if the assembly of the model was too simple. Under these circumstances, the model builder would not expend much time and effort assembling the model and, consequently, the model builder would learn very little about the subject matter that the model is intended to represent.

U.S. Pat. No. 1,393,163 to Rasely discloses an educational toy that includes a set of building blocks and a ground plan associated with the building blocks that together convey an impressionistic view of a city. It is disclosed that the educational toy is directed to instructing children as to the schematic layout of a given city, including its buildings and points of interest. The building blocks are made of a material such as artificial stone, which are adapted to fit in fixed or stationary, predetermined mounting positions on a schematic ground plan. The building blocks are pre-fabricated and are provided with the contour, outlines, color schemes, markings and proportions that convey an impressionistic idea of a particular building. The preassembled buildings blocks of the toy are merely placed in designated positions on the ground plan, but are not intended to be assembled or otherwise manipulated.

U.S. Pat. No. 1,873,748 to Favreau discloses a model for a building comprising a body having the exterior representation of a building, a removable drawer disposed in said body, which corresponds to a floor plan of the building.

U.S. Pat. No. 2,351,931 to Debs discloses a pedestal device for the three dimensional representation of buildings and other physical objects. The pedestal device includes a plurality of individual pedestal parts that are adapted to be stacked one upon another, and where the topmost pedestal part is adapted to receive a representation of a building or other physical object for display through a slot.

U.S. Pat. No. 2,315,463 to Tingley et al. discloses an architectural model of a residential home comprising a number of interchangeable model units. The model is intended to be used by the untrained home planner who is seeking a desirable design plan for a residential home to be built. The units are made from wood, metal and plastic. In addition, the roof units and foundation are constructed of solid blocks. None of the units are disclosed as being assembled from foldable, self-supporting material.

U.S. Pat. No. 2,635,359 to Broscious discloses a building model for providing a three dimensional representation of a building design. The building model includes (i) a basic block element composed of a series of adjacent individual blocks that collectively are shaped to represent a building unit, (ii) a paper cover covering the basic block element that is marked with representations of the structural details of the building unit and (iii) a removable sheet material cover piece having walls adapted to fit snugly over the basic block element to represent the exterior of the building unit.

U.S. Pat. No. 4,245,400 to Johnson discloses a three dimensional educational toy model of a community development that is intended to educate persons in the designing and laying out of a housing or community development. The toy model includes a base member depicting a plan view of a community layout thereon and a number of structural support profiles for retaining soil that is to be placed between the structural support profiles on the base member. The soil is specifically intended to be filled into the base member to shape and fill in the landscape of the community development. The model and kit, however, do not include any assembled or unassembled models of building structures.

U.S. Pat. No. 5,360,365 to Evans discloses a model kit of a sports stadium including a base member, a scaled playing surface member, a body member, a scaled exterior member and accessory members.

U.S. Pat. No. 6,073,404 to Norfleet discloses a complex modular building model comprising a base member having a number of frame units that include module attachment members, a lower level module disposed on and engaged with the base and an upper level building module is disposed on and engaged with the lower level building module. The engaging, connecting or latching of (i) base to module and (ii) module to module is carried out through the use of screws, tension bands, clamps, springs, clasps, snaps or the like.

A kit for assembling a model of a California Franciscan Mission is commercially available from Canyon Foam Design of Riverside, Calif. The model kit includes a number of model individual pieces of rigid, non-foldable expanded polystyrene. The preformed pieces of rigid, non-foldable expanded polystyrene cannot be folded or otherwise manipulated by the model builder.

None of the above art, whether taken alone or in combination, discloses the model building structure or model kit of the present invention. As such, there still exists a need in the art to provide an model kit for assembling realistic models of the various historical building structures.

SUMMARY OF THE INVENTION

The present invention, therefore, provides a three dimensional model comprising: a substantially planar base mounting member having opposite top and bottom surfaces; a first building structure adapted to be mounted on a portion of said top surface of said base mounting member, said at least one building structure assembled from a piece of foldable, self-supporting sheet material, said piece of foldable, self-supporting sheet material having fold lines thereon, and when folded along said fold lines forms said building structure; and a second building structure adapted to be mounted on a portion of said top surface of said base mounting member, said at least one building structure assembled from a piece of foldable, self-supporting sheet material, said piece of foldable, self-supporting sheet material having fold lines thereon, and when folded along said fold lines forms said second building structure.

In another embodiment, the present invention provides a kit for the assembly of a model comprising: a package containing a substantially planar base mounting member having opposite top and bottom surfaces; a first piece of foldable, self-supporting sheet material, said first piece of foldable, self-supporting sheet material having fold lines thereon, and when folded along said fold lines forms said building structure, said first building structure adapted to be mounted on a portion of said top surface of said base mounting member, said at least one building structure assembled from; and a second piece of foldable, self-supporting sheet material, said second piece of foldable, self-supporting sheet material having fold lines thereon, and when folded along said fold lines forms said second building structure that is adapted to be mounted on a portion of said top surface of said base mounting member.

BRIEF DESCRPON OF THE DRAWINGS

FIG. 7 is a plan view of two pieces of foldable, self-supporting sheet material that, when folded, forms the model flying buttresses of the model building scene of one embodiment of the present invention.

DETAILED DESCRIPTION OF THE PREFERRED EMBODIMENTS

The present invention provides a model of a historical building structure and a kit for assembling the model building structure. The model and kit find particular use as an educational tool or hobby kit. The present invention will be described in further detail with reference to FIGS. 1–10, which illustrate several embodiments of the present invention.

Figure 1:
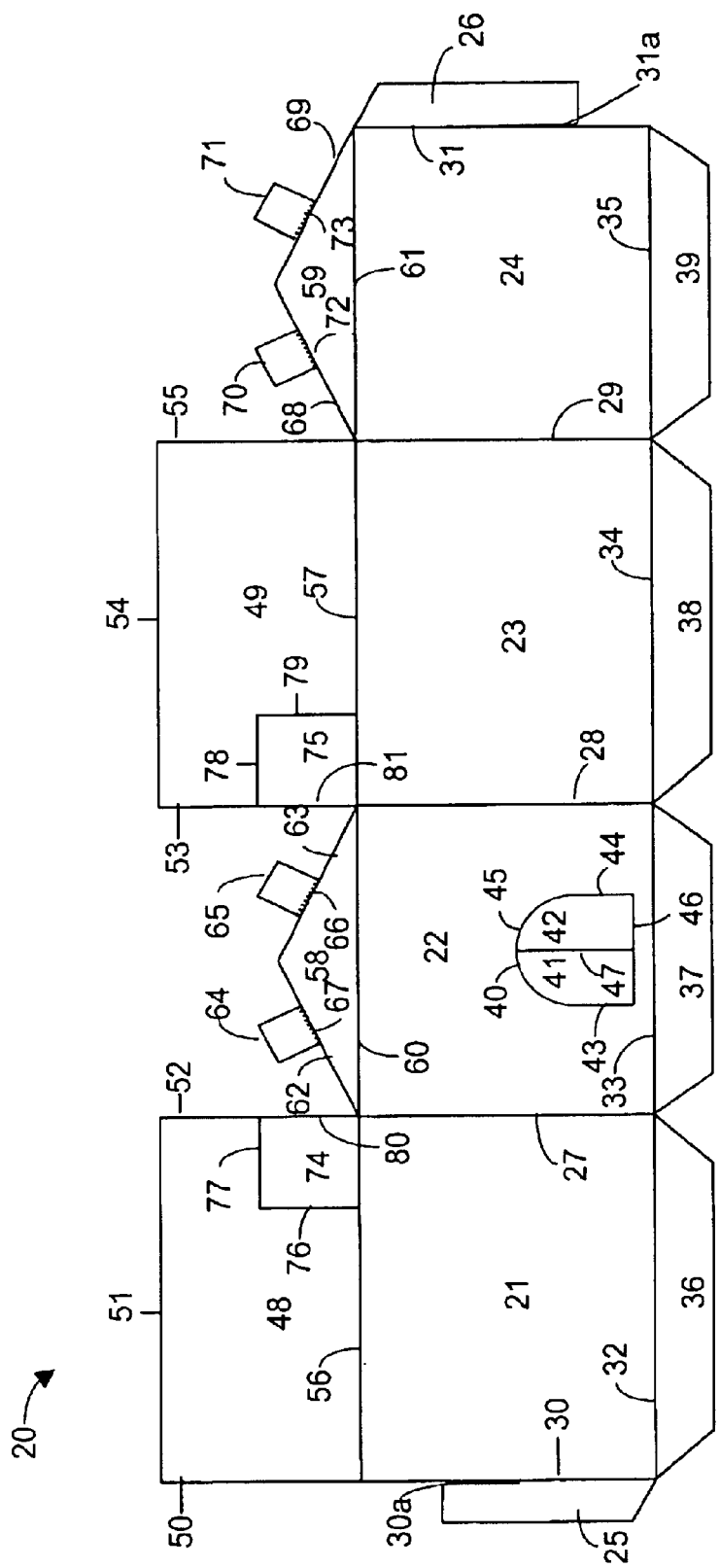
FIG. 1 is a plan view of a piece of foldable, self-supporting sheet material that, when folded, forms the first building structure of the model of the present invention.

In one embodiment, the building scene model includes a substantially flat or planar base mounting member, a first model building structure and a second model building structure. FIG. 1 shows a piece of the foldable, self-supporting sheet material having a number of fold lines thereon. The foldable, self-supporting sheet material has two opposite sides and a plurality of fold lines that divide the sheet material into a plurality of panels or sections. The first model building structure is assembled from panel 20, which is a piece of self-supporting sheet material that is folded along a number of different fold lines to form the first building structure. Panel 20 includes panels 21, 22, 23, and 24 that are folded along fold lines 27, 28 and 29 to form a substantially square- or rectangular-shaped building structure. Panels 21 and 24 are provided with tabs 25 and 26, respectively, for joining panels 21 and 24 together and maintaining the shape of the first model building structure. When properly folded, panels 21, 22, 23, 24 form four upright sides of the first building structure of the model of the present invention. When folded, panel 22 becomes the front upright side of the first building structure, panel 24 becomes the back upright side of the first building structure, panel 21 becomes the left upright side of the building model and panel 23 becomes the right upright side of the first building structure model.

In one embodiment, panel 22 of panel 20 also includes a opening leading to the inside of first building structure 20. In preferred embodiment, the opening is a door 40. Door 40 has panels 41, 42 that are joined to panel 22 at fold lines 43, 44. Cut lines 45, 46, and 47 are provided such that door 40 can be opened to lead into the inside of the first building structure 20. This is accomplished by folding door panels 41, 42 inward, thereby creating folds along fold lines 43, 44.

Panel 20 also includes roof panels 48, 49. Roof panel 48 has roof panel edges 50, 51 and 52 and is joined to the top edge of panel 21 along fold line 56. Roof panel 49 has roof panel edges 53, 54 and 55 and is joined to the top edge of panel 23 along fold line 57. Roof panels 48, 49 are foldable along fold lines 56, 57 to form the roof of the building structure model. In a preferred embodiment, roof panels 48, 49 are folded along fold lines 56, 57 in an angle such that roof panel edges 51, 54 are in substantial contact with each other, thereby forming a gabled roof structure.

Panel 20 also includes roof support panels 58, 59. Roof support panel 58 is joined to the top edge of panel 22 along line 60. Roof support panel 59 is joined to panel 24 along line 61. Lines 60, 61 are not intended to be fold lines. Roof support panel 58 includes generally sloping or angled sides 62, 63 that form the general shape of a triangle. Each of sloping sides 62, 63 include a roof support tab 64, 65 that is in the general shape of a rectangle and extend upwardly and from sloping sides 62, 63. Roof support tabs 64, 65 are joined to sloping sides 62, 63, along fold lines 66, 67. Roof support panel 59 also includes generally sloping or angled sides 68, 69 that form the general shape of a triangle. Sloping sides 68, 69 of roof support panel 59 also includes roof support tabs 70, 71 that are joined to sloping sides 68, 69 along fold lines 72, 73. Roof support tabs 70, 71 extend upwardly from the sloping sides 66, 67 and in direction that is substantially perpendicular to line 61.

In another embodiment, roof panels 48, 49 also include platform panels 74, 75. Platform panels 74, 75 are formed by cutting along cut lines 76, 77, 78, 79 and folding along fold lines 80, 81.

Four angled flaps, 36, 37, 38, and 39 are joined to the bottom edges of panels 21, 22, 23 and 24 along fold lines 32, 33, 34 and 35. Angle flaps 36, 37, 38, and 39 can be folded toward the inside of the first building structure and provide support and stability for the first building structure. Flaps 36, 37, 38, 39 are adapted to be placed on, or rest on, the top surface of the base mounting member of the model.

Figure 2A:
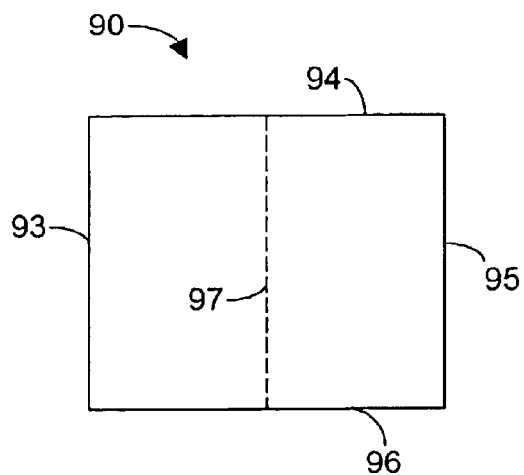
FIGS. 2A, 2B, 2C are plan views of pieces of foldable, self-supporting sheet material that, when folded, forms various roof tiles of the model building structures of the model building scene of the present invention.

Now referring to FIG. 2A, model also includes roof tile panel 90 that is adapted for placement over roof panels 48, 49. In one embodiment, roof tile panel 90 is substantially rectangular in shape and has four perimeter edges 93, 94, 95, 96. Roof tile panel 90 also includes fold line 97 extending longitudinally along the length of the roof tile panel 90 from perimeter edge 93 to perimeter edge 95.

Figure 2B:
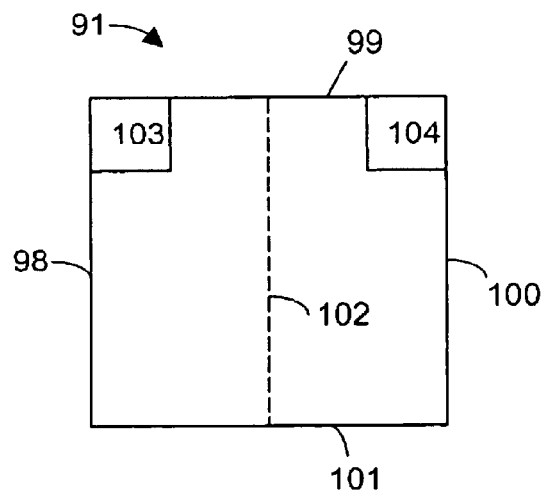

Now referring to FIG. 2B, in another embodiment, roof tile panel 91 is also substantially rectangular in shape and includes perimeter edges 98, 99, 100 and 101. Roof tile panel 91 also includes fold line 102 extending longitudinally along the length of the roof tile panel 91 from perimeter edge 99 to perimeter edge 101. Roof tile panel 91 also includes generally square shaped roof tile cut out sections 103 and 104.

Figure 2C:
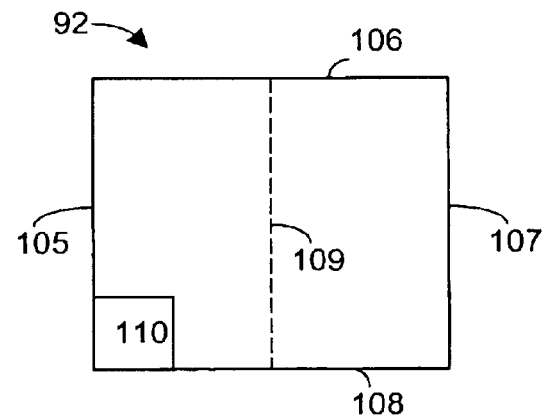
Figure 3:
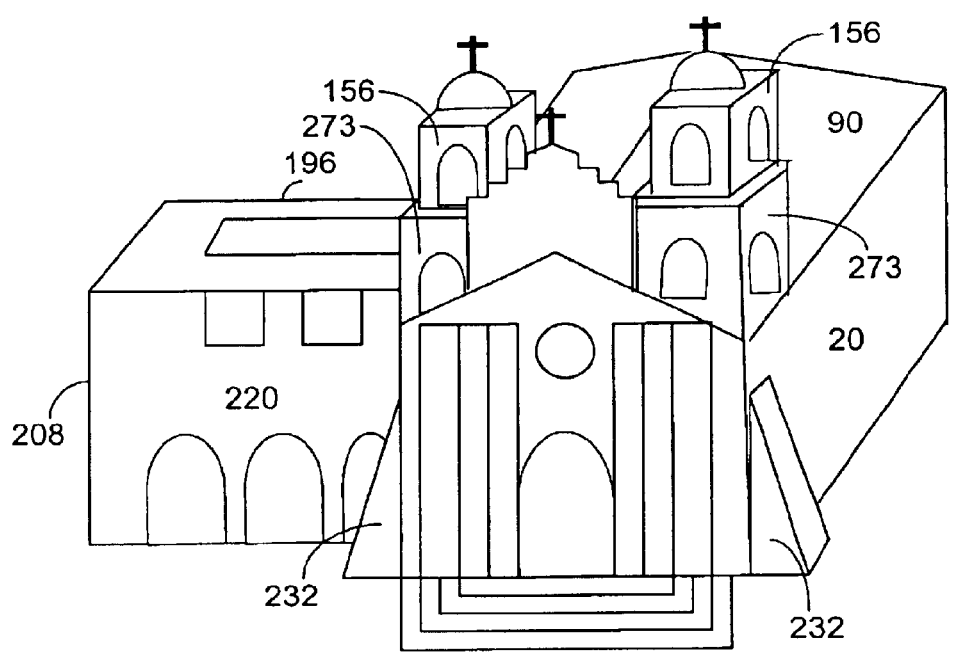
FIG. 3 is a perspective view of the assembled model building scene, according to one embodiment of the present invention.

Now referring to FIG. 2C, in a further embodiment, roof tile panel 92 is also substantially rectangular in shape and includes perimeter edges 105, 106, 107 and 108. Roof tile panel 92 also includes fold line 109 extending longitudinally along the length of the roof tile panel 92 from perimeter edge 106 to perimeter edge 108. Roof tile panel 92 also includes generally square shaped roof tile cut out section 110.

Figure 4A:
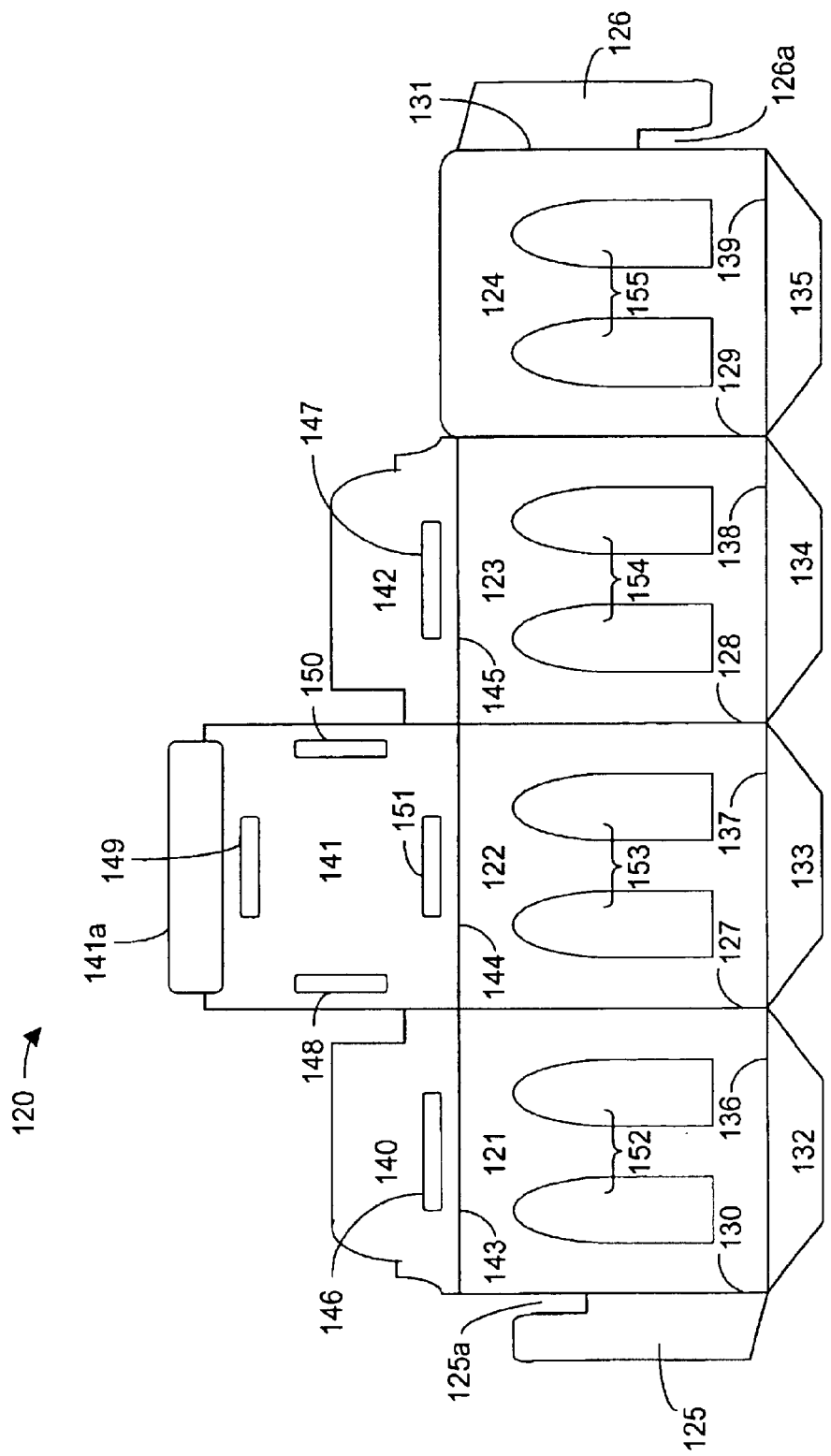
FIG. 4A is a plan view of a piece of foldable, self-supporting sheet material that, when folded, forms the model of a large bell tower of the model building scene of the present invention.

Now referring to FIG. 4A, the kit includes panel 120 that, when assembled, forms a large bell tower that is adapted to be positioned or disposed on the roof of the first model building structure. Panel 120 includes panels 121, 122, 123, 124. Panels 121, 122, 123, 124 are divided into sections be fold lines, 127, 128, 129. Upward tab 125 is joined to a portion of panel 121 along fold line 130. Downward tab 126 is joined to a portion of panel 124 along fold line 131. Flanges panels 132, 133, 134 and 135 are joined to the bottom edges of panels 121, 122, 123, 124 along fold lines, 136, 137, 138, 139. Panels 121, 122, 123, 124 have cut out portions, 152, 153, 154, 155 that form openings to give the appearance of windows. Panels 140, 141 and 142 are joined to the top edge of panels 121, 122, 123 along fold lines 143, 144, 145. Panel 140 is provided with a cut out section 146 that is adapted to be an insert slot for a tab S8 member of a small bell tower. Panel 141 is the roof top of the large bell tower. Panel 141 has four cut out sections 148, 149, 150, 151 that form insert slots for a tab member of a small bell tower. Panel 142 is provided with a cut out section 147 that is adapted to be an insert slot for a tab member of the small bell tower.

Figure 4B:
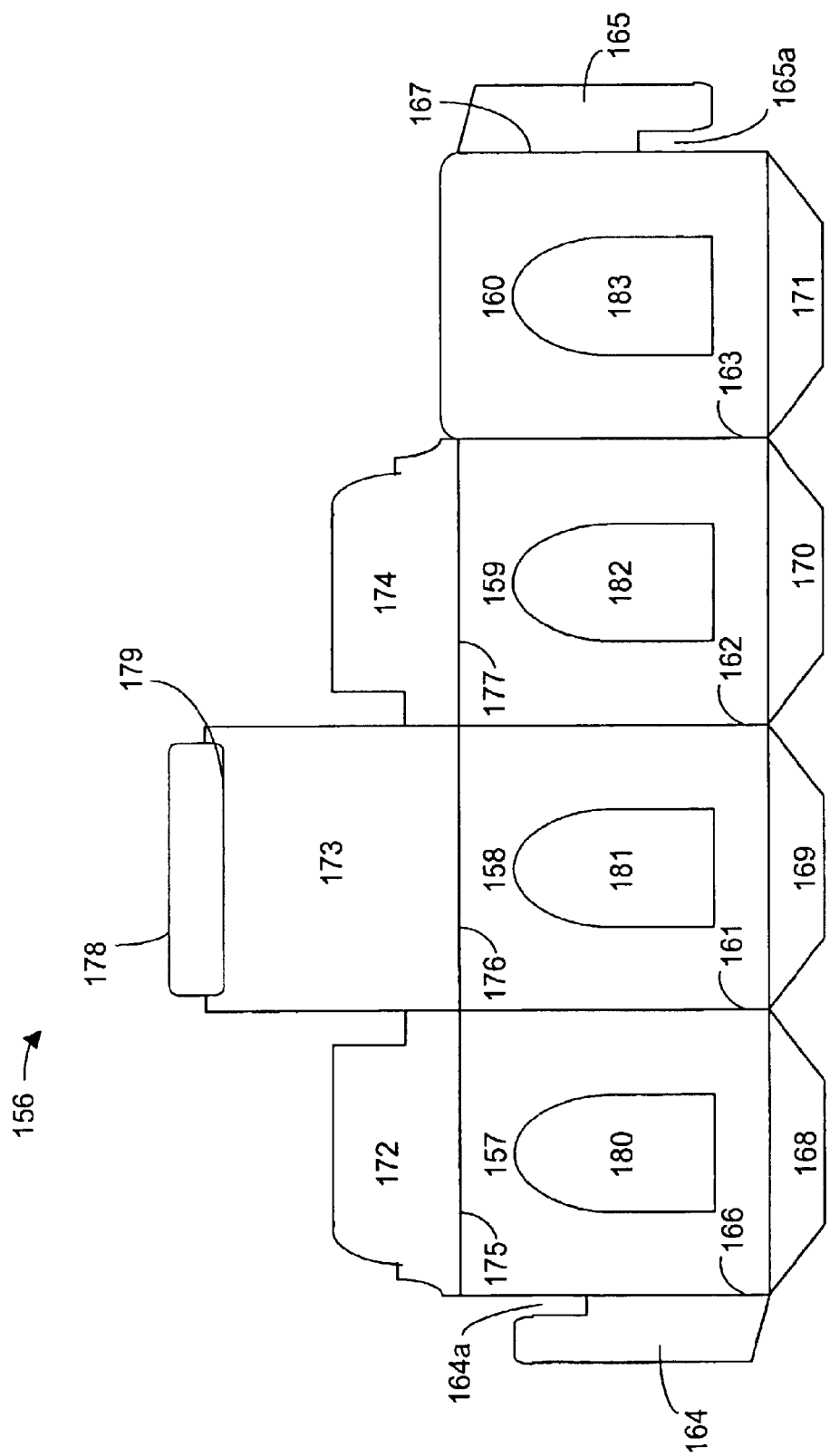
FIG. 4B is a plan view of a piece of foldable, self-supporting sheet material that, when folded, forms the model of a small bell tower of the model building scene of the present invention.

Now referring to FIG. 4B, the kit also includes panel 156 that, when folded, forms a small bell tower that is adapted to be positioned on the top portion of the large bell tower described above. Panel 156 includes panels 157, 158, 159, 160. Panels 157, 158, 159, 160 are divided into sections by fold lines 161, 162, 163. Upward tab 164 is joined to panel 157 along fold line 166. Downward tab 165 is joined to a portion of panel 160 along fold line 167. The bottom portions of panels 157, 158, 159, 160 end into insert tab members 168, 169, 170, 171. Inset tab members 168, 169, 170, 171 are adapted to be inserted into insert slots 148, 149, 150, 151 of the top panel 141 of the large bell tower. Panels 172, 173, 174 are joined to the top portions of panels 161, 162, 163 along fold lines 175, 176, 177. Panel 173 has a tuck portion 178 that is joined to panel 173 along fold line 179.

Panels 157, 158, 159, 160 also include cut out portions 180, 181, 182, 183, which represent openings in the small bell tower.

Figure 4C:
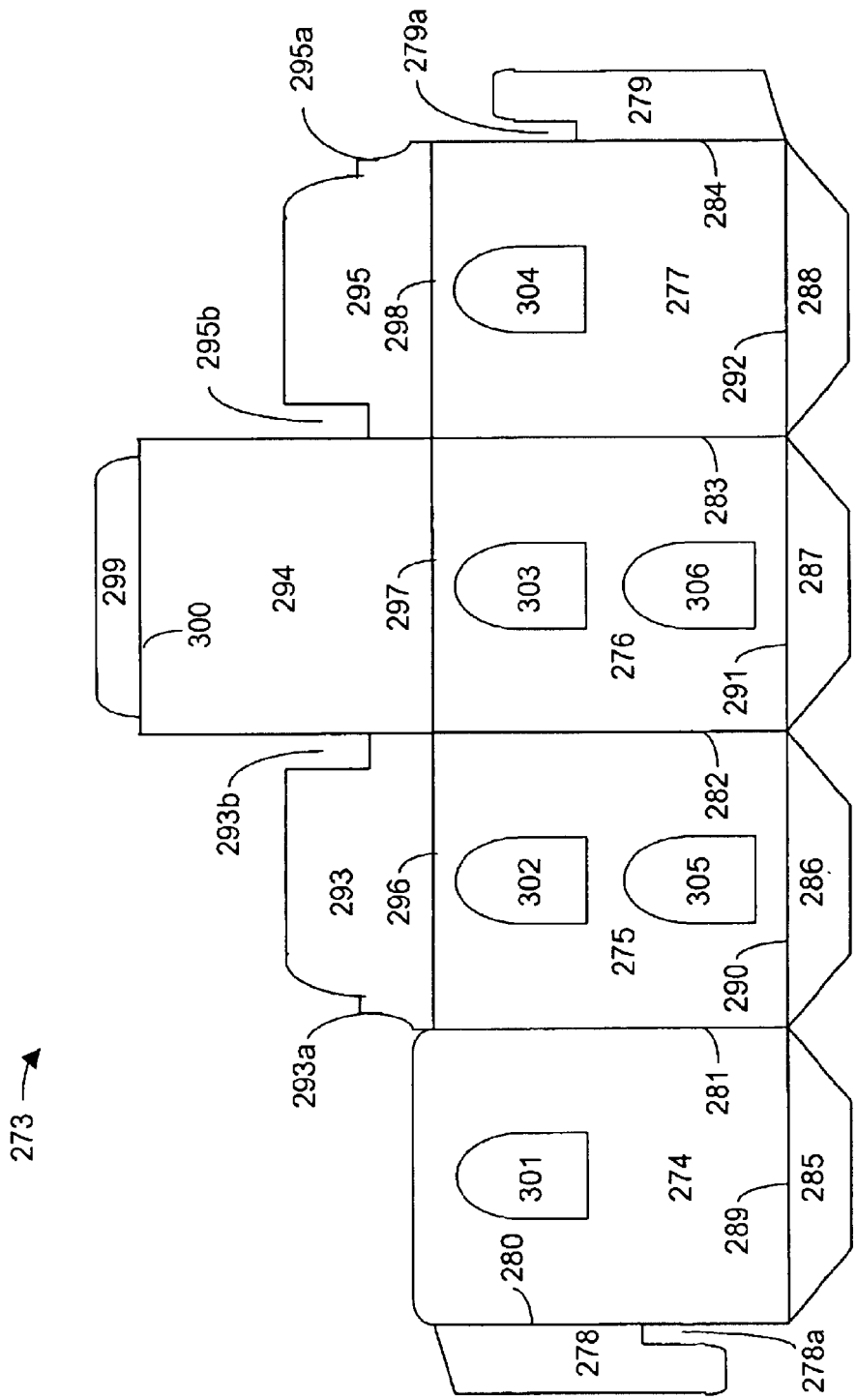
FIG. 4C is a plan view of a piece of foldable, self-supporting sheet material that, when folded, forms the model of a two story bell tower of the model building scene of the present invention.

Now referring to FIG. 4C, in one embodiment, the kit also includes panel 273 that, when folded, forms a two-story bell tower that is adapted to be positioned on top of the roof of the building structure. Panel 273 includes panels 274, 275, 276, 277. Panels 274, 275, 276, 277 are divided into sections by fold lines 281, 282, 283. Downward facing locking tab 278 is joined to a portion of panel 274 along fold line 280. A locking tab slot 278a is formed in the space between locking tab 278 and panel 274. Upward facing tab 279 is joined to a portion of panel 277 along fold line 284. A locking tab slot 279a is formed in the space between locking tab 279 and panel 277. Flange tab members 285, 286, 287, 288 are joined to the bottom edges of panels 274, 275, 276, 277 along fold lines, 289, 290, 291, 292, respectively. Bell tower roof support panels 293, 295 and roof panel 294 are joined to the top portions of panels 275, 276, 277 along fold lines 296, 297, 298, respectively. Bell tower roof support panels have notched edges 293a, 293b, 295a, 295b. Panel 294 has a tuck portion 299 that is joined to the top edge of panel 294 along fold line 300. Panels 274, 275, 276, 277 also include cut out portions 301–306, which represent openings in the bell tower.

Figure 5:
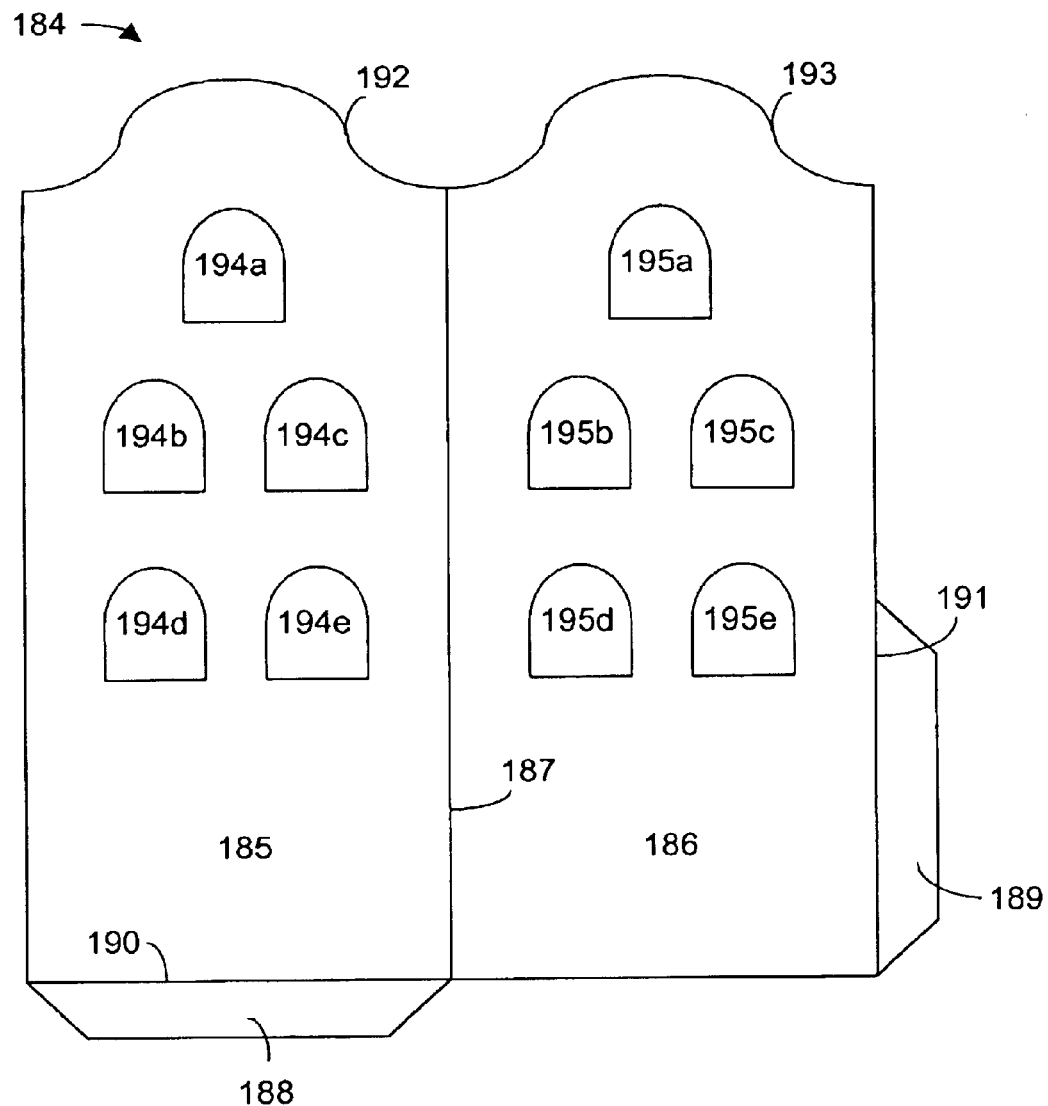
FIG. 5 is a plan view of a piece of foldable, self-supporting sheet material that, when folded, forms the model campanario of the model building scene of one embodiment of the present invention.

Now referring to FIG. 5, the kit includes panel 184 that, when assembled, forms the campanario portion of the building model. The term "campanario" refers to a structure intended to hold bells, which is usually a tower or wall having a number of open arch structures. Panel 184 includes panels 185, 186. Panels 185 and 186 are divided into separate sections along fold line 187. Panels 185 and 186 are adapted to be folded in a back to back manner, such that the back sides of panels 185 and 186 are in contact with each other. Flange panel 188 is joined to the bottom edge of panel 185 along fold line 190. Flange panel 188 is adapted to be placed in contact with the top surface of the base mounting member of the model. Flange panel 189 is joined to a lower portion of an upright side edge of panel 185 along fold line 191. Flange panel 189 is adapted to be brought into contact with one of the upright sides of the first or second building structures of the model. Top edge portions 192, 193 of panels 185, 186 arc provided with a fancy architectural design. Panels 185, 185 are each provided with at least one cut out portion that forms an opening, such as a window. FIG. 5 shows an illustrative embodiment, wherein each of panels 185, 186 have five cut out portions 194a–194e, 195a–195e.

Figure 6A:
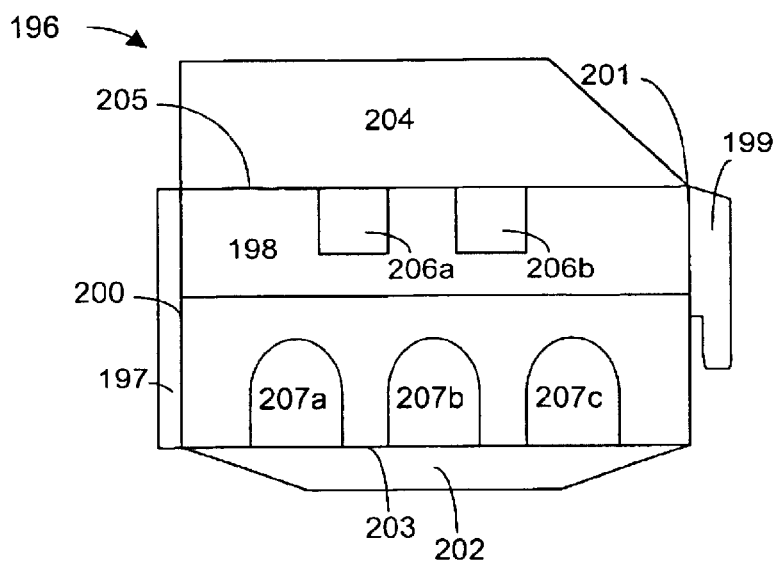
FIGS. 6A–6C are a plan views of three pieces of foldable, self-supporting sheet material that, when folded, forms the model second building structure of the model building scene, according to one embodiment of the present invention.

The kit includes panels 196, 208, 220 that, when assembled, for either a model of a courtyard or living quarters. Now referring to FIG. 6A, panel 196 includes wall tab member 197, upright wall panel 198 and locking tab 199. Wall tab member is joined to an end edge of upright wall panel 198 along line 200. Locking tab 199 is joined, along fold line, 201, to an upper portion of the opposite edge of upright wall panel 198. Flange panel 202 is joined to the bottom edge of upright wall panel 198 along fold line 203. Angled roof panel 204 is joined along the top edge of upright wall panel 198 along fold line 205. Upright wall panel 198 includes at least one cut out section, thereby forming an opening communicating from one side of the panel 198 to the other side of the panel. FIG. 6A shows an illustrative embodiment of the model kit of the present invention, wherein an upright portion of panel 198 includes two square shaped cut out sections 206a, 206b along the top edge of upright wall panel 198 and three cut out sections 207a–207c that are positioned near the bottom edge of upright wall panel 198.

Figure 6B:
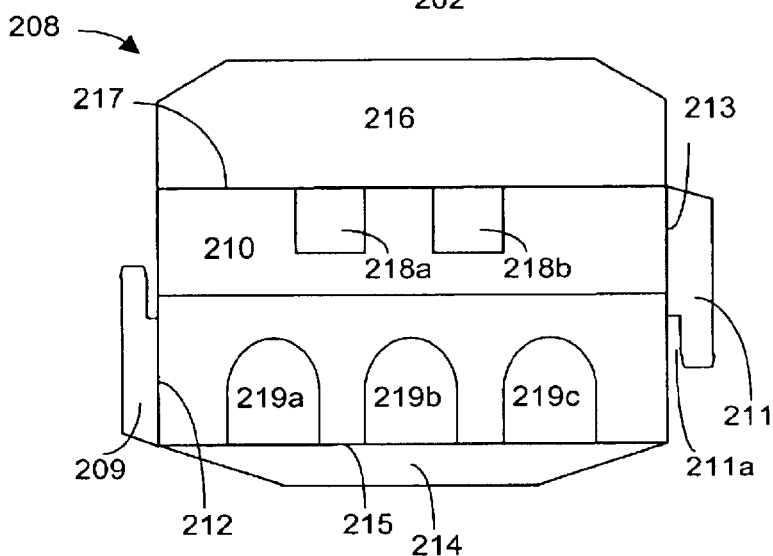

Now referring to FIG. 6B, panel 208 includes upward locking tab member 209, upright wall panel 210 and downward locking tab 211. Locking tab member 209 is joined to an end edge of upright wall panel 210 along fold line 212. Locking tab 211 is joined, along fold line 213, to an upper portion of the opposite edge of upright wall panel 210. Flange panel 214 is joined to the bottom edge of upright wall panel 210 along fold line 215. Angled roof panel 216 is joined along the top edge of upright wall panel 210 along fold line 217. Upright wall panel 210 includes at least one cut out section, thereby forming an opening communicating from one side of the panel 210 to the other side of the panel. FIG. 6B shows an illustrative embodiment of the model kit of the present invention, wherein panel 210 includes two square shaped cut out sections 218a, 218b along the top edge of upright wall panel 210 and three cut out sections 219a–219c that are positioned near the bottom edge of upright wall panel 210.

Figure 6C:
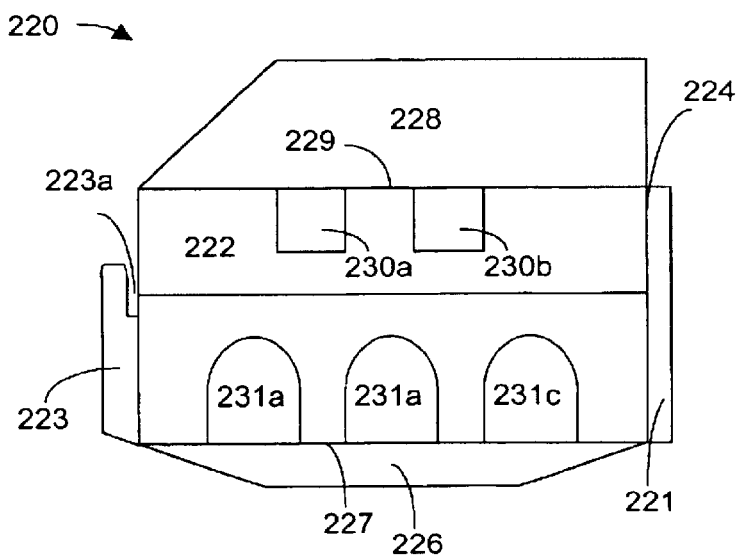

Now referring to FIG. 6C, panel 220 includes wall tab member 221, upright wall panel 222 and locking tab 223. Wall tab member 221 is joined to an end edge of upright wall panel 222 along line 224. Locking tab 223 is joined, along fold line 225, to an lower portion of the opposite edge of upright wall panel 222. Flange panel 226 is joined to the bottom edge of upright wall panel 222 along fold line 227. Angled roof panel 228 is joined along the top edge of upright wall panel 222 along fold line 229. Upright wall panel 222 includes at least one cut out section, thereby forming an opening communicating from one side of the panel 222 to the other side of the panel. FIG. 6C shows an illustrative embodiment of the model kit of the present invention, wherein panel 222 includes two square shaped cut out sections 230a, 230b along the top edge of upright wall panel 198 and three cut out sections 231a–231c that are positioned near the bottom edge of upright wall panel 222.

Now referring to FIG. 7, the model kit of the present invention includes panel 232. Panel 232 includes panels 233, 234, 235. Panels 233, 234, 235 are divided into distinct sections by fold lines 236, 237. Tab 238 is joined to a portion of the edge of panel 233 along fold line 240. Tab 239 is joined to a portion of panel 235 along fold line 241. When folded, panel 232 forms a flying buttresses that is adapted to be positioned along an upright side walls of the model building structure of the present invention. The flying buttresses are structures that provide support to the upright side walls of the building structure.

Figure 8A:
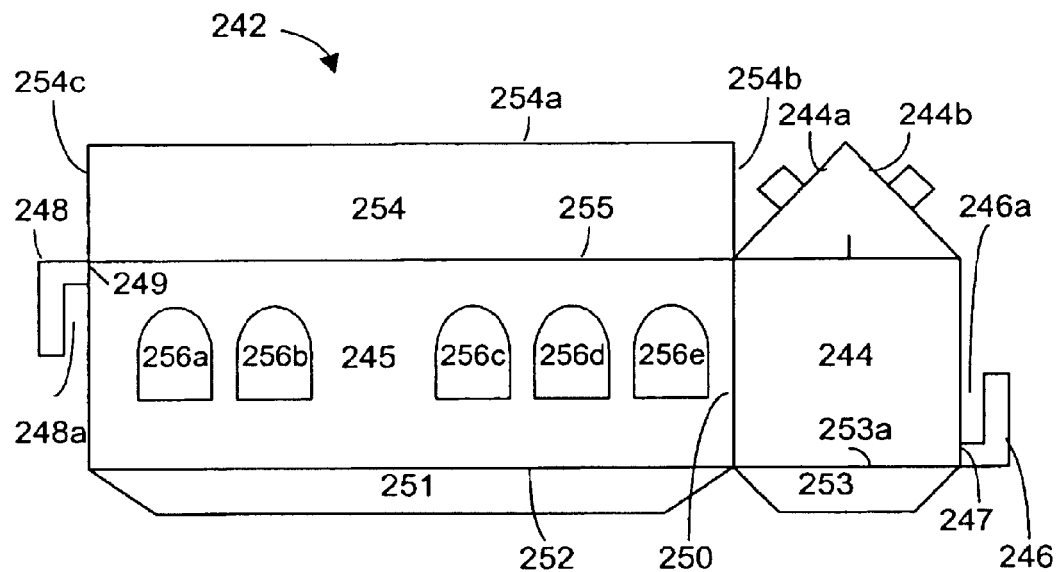
FIGS. 8A and 8B are plan views of two pieces of foldable, self-supporting sheet material that, when folded, form the second building structure of the model building scene of one embodiment of the present invention.
Figure 8B:
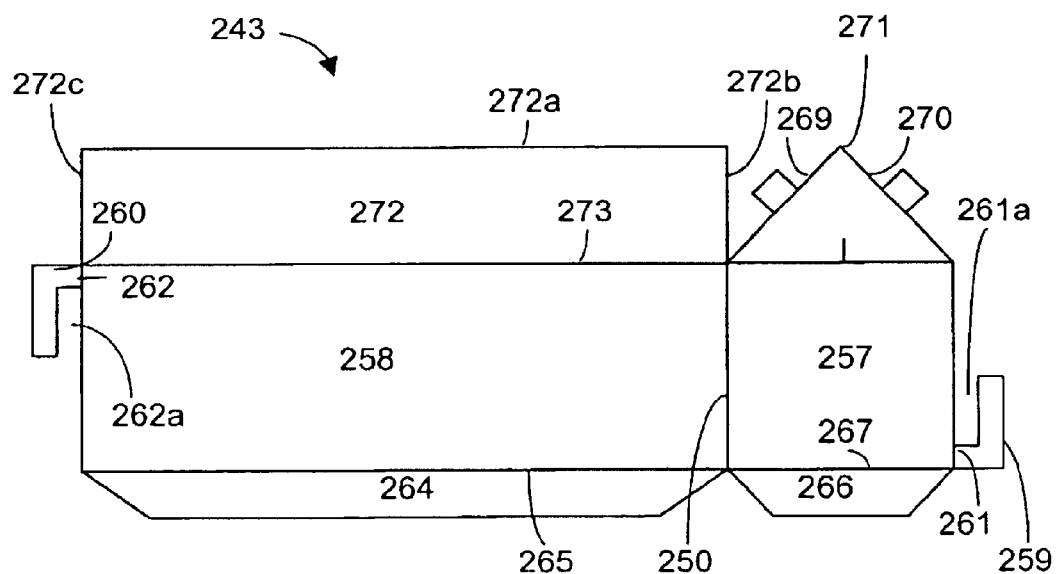

FIGS. 8A and 8B show panels 242 and 243, which are use in another embodiment of the model kit of the present invention. Panels 242, 243, when assembled, form an alternate embodiment of the living quarters portion of the building model of the present invention. Now referring to FIG. 8A, panel 242 includes end panel 244 and elongated side panel 245. Panel 242 includes locking tab 246, which is joined to panel 244 along fold line 247. Tab slot 246a is located in the gap between locking tab 246 and end panel 244. Panel 242 also includes downward locking tab 248, which is joined to a portion of panel 245 along fold line 249. Locking tab slot 248a is located in the space between locking tab 248 and side panel 245. Panels 244 and 245 are joined along fold line 250. Side edge flange 251 is joined to the bottom edge of elongated side panel 245 along fold line 252. End edge flange 253 is joined to the bottom edge of end panel 244 along fold line 253a. Side panel 245 also includes at least one cut out portion that forms an opening. Roof panel 254 is joined to the top edge of side panel 245 along fold line 255. FIG. 8A shows an illustrative embodiment of the present invention, where elongated side panel 245 includes five cut out portions 256a–256e.

FIG. 8B depicts panel 243, which includes end panel 257 and elongated side panel 258. Panel 243 also includes upward locking tab 259, which is joined to a portion of the edge of end panel 257 along fold line 261. The space between locking tab 259 and end panel 257 creates tab insert slot 261a. Panel 243 includes downward tab 260, which is joined to a portion of side panel 258 along fold line 262. The space created between tab 260 and side panel 258 is a insert slot 262a. Flange panel 264 is joined to the bottom portion of side panel 258 along fold line 265. Flange panel 266 is joined to the bottom edge of end panel 257 along fold line 267. The top portion 268 of end panel 257 includes sloping edges 269, 270 that terminate into point 271. Panel 243 also includes roof panel 272 that is joined to the top portion of side panel 258.

Figure 9A:
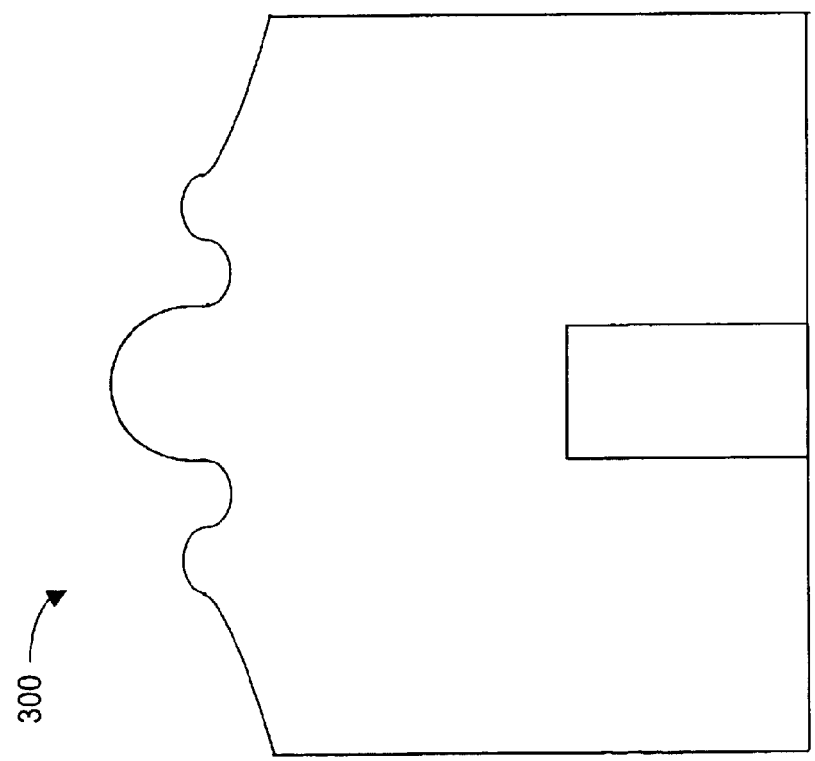
FIGS. 9A–9C are plan views of architectural pediments of different embodiments of the model building scene of the present invention.
Figure 9B:
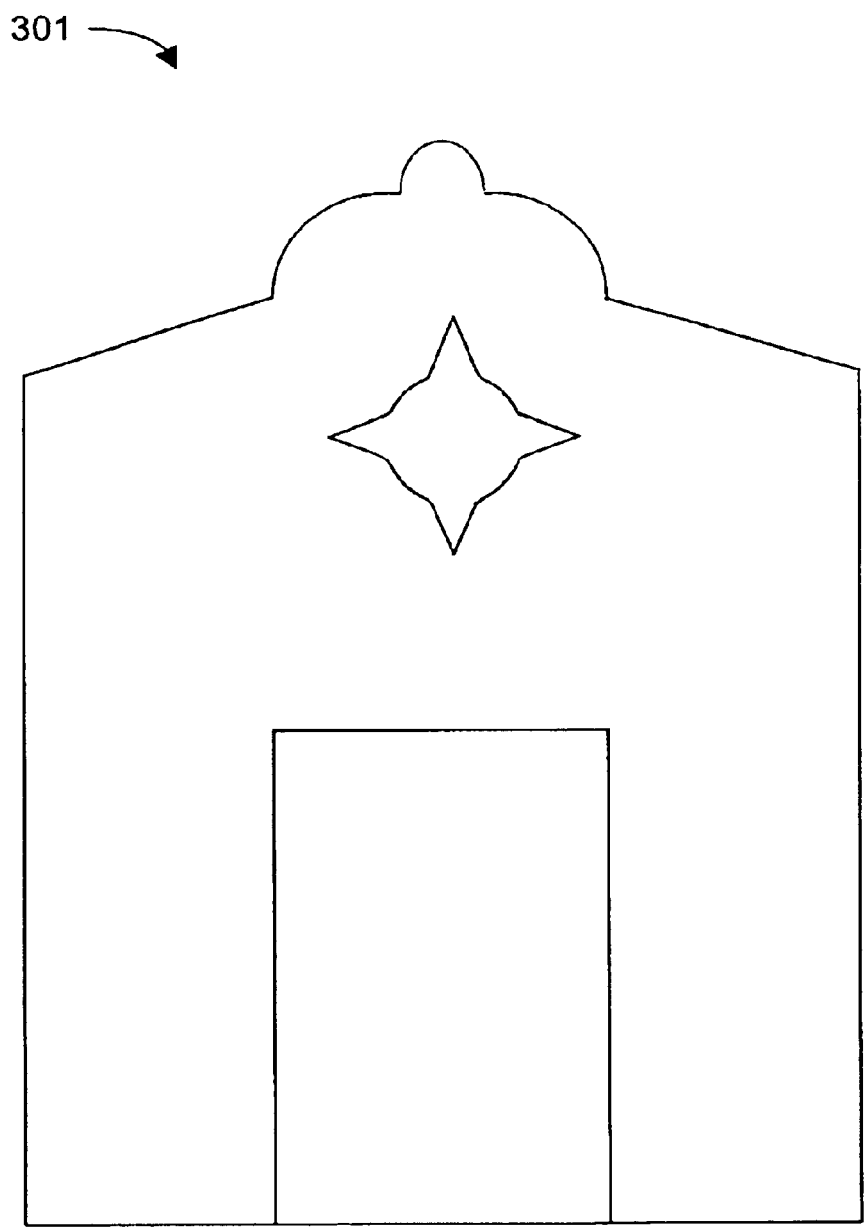
Figure 9C:
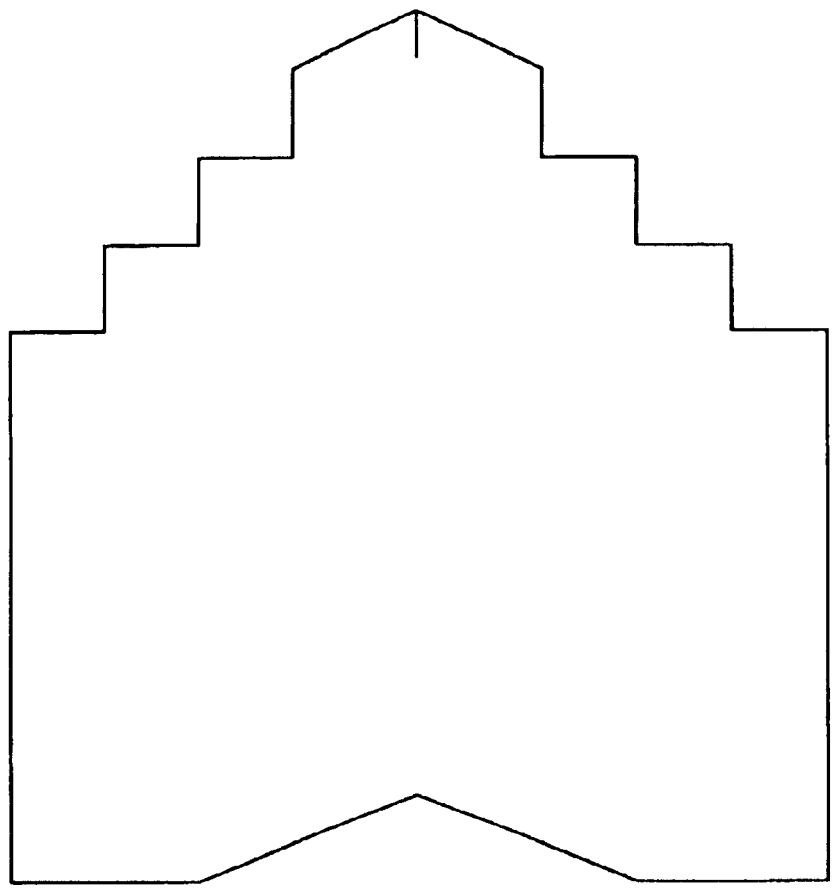

As shown in FIGS. 9A–9C, the model kit also includes additional pieces of self-supporting sheet material 300-302 that are used in the formation of various architectural designs, such as pediments, facades, steps and columns.

In another embodiment, the model kit of the present invention also includes instructions for the assembly of the model building structures. Preferably, the instructions for assembly of the model building structures are provided in the form of instruction sheets, an instruction booklet, an instruction leaflet, an instruction pamphlet, or instruction manual. More preferably, the instructions are provided in the form of a plurality of instruction sheets, which contain detailed instructions for the complete assembly of the model building structures. The instructions may be provided within the flexible plastic package, along with the other components of the model kit. In an alternative embodiment, the instructions are not included inside the flexible package with the other components of the model kit, but may be provided outside the package, for example, attached to the outside of the flexible package.

In another embodiment, the kit of the present invention further comprises an educational quiz or test. The quiz includes a series of questions relating to a desired educational topic. The quiz may include questions on subjects such as, for example, mathematics, geometry, history or science. Preferably, the educational quiz provided in the model kit includes a series of questions relating to the subject of geometry. The quiz is provided with the kit such that school age children can complete the educational quiz contemporaneously with the assembly of the model building structure, or immediately after assembly of the model building structure is completed. The quiz is intended as an educational tool to teach the assembler about the shapes and geometry of the different components of the model building structure.

The foldable, self-supporting sheet material is a rigid or semi-rigid material. The term "self-supporting," as used in the specification, refers to a sheet material which is stiff enough in the upright position, such that the assembled model building structure will stand without any sagging. Any material may be used as the self-supporting sheet material so long as the material is foldable and self-supporting. In a preferred embodiment, corrugated cardboard is utilized as the foldable, self-supporting sheet material. The corrugated cardboard may be any conventional corrugated cardboard comprising a thin flat cardboard layer which provides a first surface, a middle layer having parallel corrugations, and another thin flat cardboard layer which provides a second surface. In a preferred embodiment, the first and second surface of the corrugated cardboard material, which becomes the outer or exterior of the building structure model, is coated with a suitable pigment giving the outer surface a realistic, white colored appearance.

The kit according to the present invention comprises a flexible transparent water-proof package constructed from a plastic sheet material. The plastic package contains all of the materials required for the assembly of the building structure model of the present invention. The plastic sheet material may comprise any known plastic material that can be sealed, and is transparent and water-proof. The flexible, waterproof package can be selected from a polyalkylene, such as polyethylene (PE), polypropylene (PP); or polyvinyl chloride (PVC). A preferred plastic sheet material is polyvinyl chloride (PVC).

Figure 10:
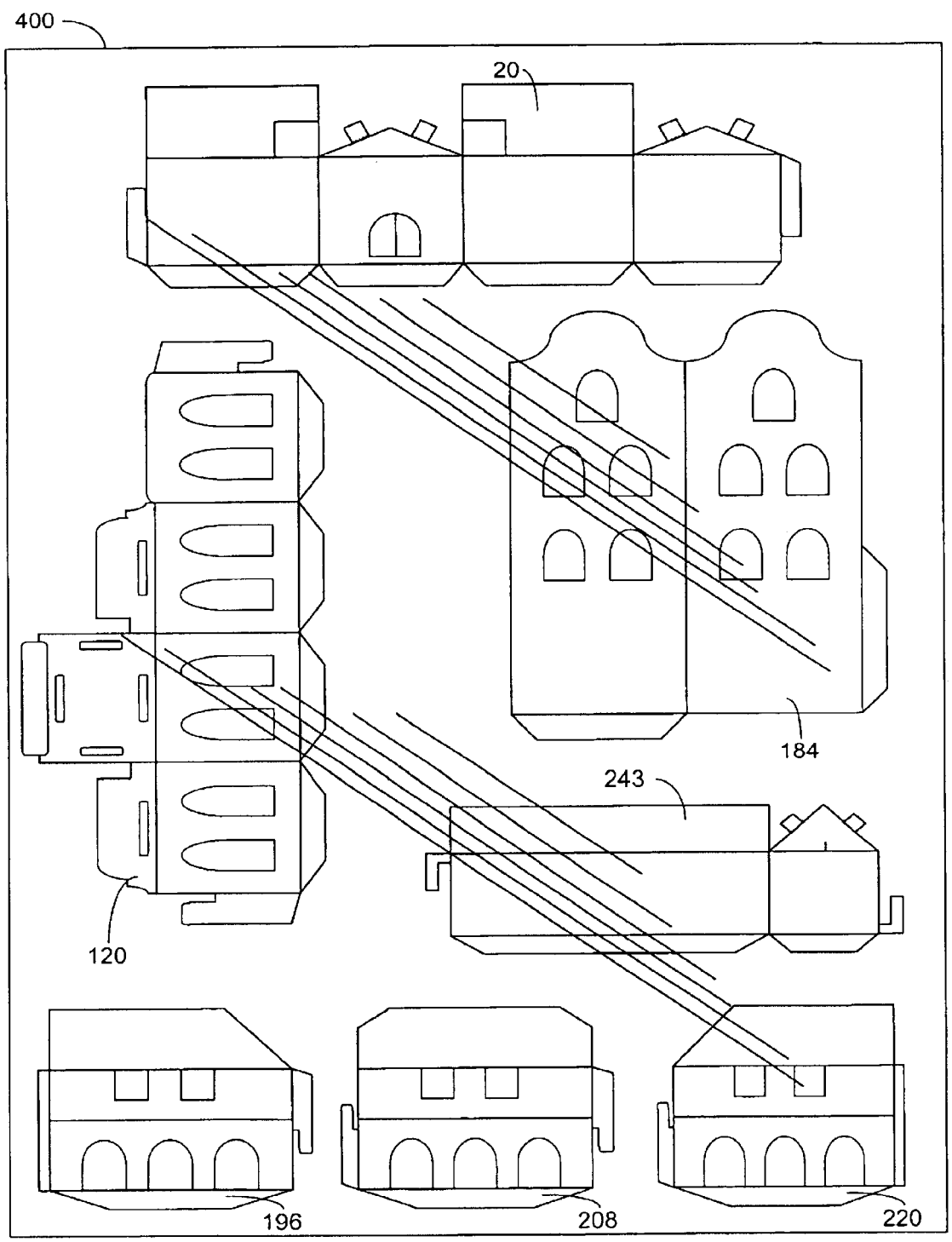
FIG. 10 is a plan view of one embodiment of the model kit of the present invention containing the materials for the assembly of the model building scene of the present invention.

FIG. 10 shows one embodiment of the kit 400 of the present invention. The plastic package may be formed by any conventional means. For example, the plastic sheeting material may be folded along the transverse center line and sealed along the other three edges by stretching or heat sealing after all of the required materials have been placed inside.

In a preferred embodiment, the model kit is for the assembly of a historical church or church scene. Preferably, the model is for the assembly of one of the historical California Franciscan Missions. In one embodiment, the kit of the present invention can be used to build a model of Mission Soledad, Mission Solano, Mission San Jose, Mission San Rafael, Mission San Miguel Arcangel. In another embodiment, the kit of the present invention can be used to Mission San Diego, Mission Santa Barbara, Mission San Juan Bautista, and Mission Carmel. It should be noted that the model of the present invention can be used to assemble the remaining California Franciscan Missions, in addition to those specifically recited hereinabove.

To begin the assembly of the model building structure, the model builder must first open the flexible waterproof package and remove the plurality of pieces of foldable self-supporting sheet material and instructions. Each piece of the foldable, self-supporting sheet material should be placed on a clean, flat, horizontal surface. A desk, table or floor are particular useful environments for assembling the integral base. There is no particular required order for the assembly of the individual components of the model of the present invention. However, it is preferable to assemble the first building structure from panel 20 first.

To assemble the building structure, panels 21, 22, 23, 24 of panel 20 of self-supporting sheet material 20 are folded along fold lines 27, 28, 29 to "square-up" the building structure. Flange panels 36, 37, 38, 39 of the building structure are folded inwardly to provide support and stability to integral base. Locking tabs 25, 26 are folded inward along fold lines 30, 31. Locking tab 25 is inserted into slot 31a formed between panel 24 and locking tab 26. Locking tab 26 is inserted into slot 30a formed between panel 21 and locking tab 25. Roof support tabs 64, 65, 70, 71 are folded down and toward the inner portion of the squared-up building structure. The roof is formed by first folding roof panels 48 and 49 at an angle until edge 51 of roof panel 48 and edge 54 of roof panel 49 are in contact with each other. Edges 51, 54 can be fixedly or detachably bonded together by a mechanical or adhesive means.

The roof tiles are then assembled and placed over the roof of the building structure formed by roof panels 48, 49. Roof tile panel 90 is used for the models of Mission San Rafael, Mission Soledad, Mission Solano, Mission, San Miguel Arcangel, Mission San Diego and Mission San Juan Bautista, as these Missions do not have bell towers located on their roofs. With reference to FIG. 3A, roof tile panel 90 is folded in half along fold line 97. Once folded, roof tile panel 90 is placed over roof panels 48, 49, with the bottom surface of the tile panel 90 in contact with the top surface of the roof panels 48, 49.

Roof tile panel 91 is used for the models of Mission Carmel and Mission Santa Barbara, as these Missions have two bell towers located on their roofs. With reference to FIG. 3B, roof tile panel 91 is folded in half along fold line 102. Once folded, roof tile panel 91 is placed over roof panels 48, 49, with the bottom surface of the tile panel 91 in contact with the top surfaces of roof panels 48, 49. Cut-out portions 103 and 104 are then cut-out from panel 91.

Roof tile panel 92 is used for the models of Mission San Jose, as this Mission has only one bell tower located on its roof. With reference to FIG. 3C, roof tile panel 92 is folded in half along fold line 109. Once folded, roof tile panel 92 is placed over roof panels 48, 49, with the bottom surface of roof tile panel 92 in contact with the top surfaces of roof panels 48, 49. Cut-out portion 10 is then cut-out from panel 92.

In another embodiment, the historical building model includes a second building, which is intended to be a realistic representation of the living quarters for the Mission. The living quarters for Mission Santa Barbara and Mission Carmel is assembled from panels 196, 208, 220. Panels 196, 208, 220 are connected via locking tabs and locking slots to form the upright sides of the living quarters of Missions Carmel and Santa Barbara.

Panel 196 includes opposite inside and outside facing surfaces. Wall tab member 197 is folded toward the inside facing surface of panel 196. Downward facing locking tab 199 is folded along fold line 201. Wall tab member is joined to an end edge of upright wall panel along line 200. Flange panel 202, which joined to the bottom edge of upright wall panel 198, is folded up and toward the inside facing surface of panel 196 along fold line 203. Angled roof panel 204, which is joined along the top edge of upright wall panel 198, is folded down and toward inside facing surface of panel 196 along fold line 205. The cut-out sections of upright wall panel 198 of panel 196 are then cut out, thereby forming an openings that communicate from inside facing surface to outside facing surface of panel 198. In FIG. 6A, an illustrative embodiment of the model kit of the present invention is shown, wherein panel 198 includes two substantially square shaped cut out sections 206a, 206b have been cut out along the top edge of upright wall panel 198 and three cut out sections 207a–207c have been cut out along the bottom edge of upright wall panel 198.

Panel 208 is then folded and connected to panel 196. Panel 208 includes upright wall panel 210 and locking tabs 209, 211. Downward facing locking tab 209, which is joined to a upper portion of end edge of upright wall panel 210, is folded toward the inside facing surface of panel 210 along fold line 212. Upward facing locking tab 211, which is joined to a lower portion of panel 210 along fold line 213, is folded toward the inside facing surface of panel 210 along fold line 213. Flange panel 214, which is joined to the bottom edge of upright wall panel 210, is folded up and toward the inside surface of panel 208 along fold line 215. Angled roof panel 216, which is joined along the top edge of upright wall panel 210, is folded down and toward the inside surface of panel 210 along fold line 217. FIG. 6B shows an illustrative embodiment of the model kit of the present invention, wherein panel 210 includes two square shaped cut out sections 218a, 218b along the top edge of upright wall panel 210 and three cut out sections 219a–219c that are positioned near the bottom edge of upright wall panel 210. Panel 196 is connected to panel 208 by inserting locking tab 199 of panel 196 into tab slot 209a of panel 208 and by inserting locking tab 209 of panel 208 into tab slot 199a of panel 196.

The final upright wall of the living quarters of the models of Missions Carmel and San Barbara is assembled by folding panel 220 and connecting it to panel 208. Panel 220 includes wall tab member 221, upright wall panel 222 and locking tab 223. Wall tab member 221, which is joined to an end edge of upright wall panel 222 along line 224. Wall tab 221, which is joined to an upper portion of panel 222 along fold line 224, is folded toward the inside facing surface of panel 220 along fold line 224. Flange panel 226, which is joined to the bottom edge of upright wall panel 222 is folded up and toward the inside facing surface of panel 222 along fold line 227. Angled roof panel 228, which is joined along the top edge of upright wall panel 222, is folded down and toward the inside surface of panel 222 along fold line 229. Upright wall panel 222 includes at least one cut out section, thereby forming an opening communication from one side of the panel 222 to the other side of the panel. FIG. 6C shows an illustrative embodiment of the model kit of the present invention, wherein panel 222 includes two square shaped cut out sections 230a, 230b along the top edge of upright wall panel 198 and three cut out sections 231a–231c that are positioned near the bottom edge of upright wall panel 222. Panel 220 is connected to panel 208 by inserting locking tab 223 of panel 220 into tab slot 211a of panel 208 and by inserting locking tab 211 of panel 208 into tab slot 221a of panel 220. The outside facing surface of folded flange tabs 202, 214, 226 are adapted to be placed on the top surface of the base mounting member and provides support and stability to the living quarters of the model. Wall tabs 197, 223 are adapted to positioned in contact to an upright side of the first building structure. Wall tabs 197, 223 can be merely brought into contact with a portion of an upright side of the first building structure or, alternatively, the wall tabs 197, 223 can be fixedly or releasably attached to an upright side of the first building structure. Panel 196 it connected to panel 208 in substantially the same manner in which panel 208 to connected to panel 220.

In another embodiment, the second building structure of the model of the present invention represents the living quarters of Mission San Diego, Mission Soledad, Mission Solano, Mission San Jose, Mission San Juan Bautista, San Miguel Arcangel and Mission San Rafael. According to this embodiment, the living quarters are of a different architectural design from the design of the living quarters for Missions Carmel and Santa Barbara.

The living quarters of the models of Mission San Diego, Mission Soledad, Mission Solano, Mission San Jose, Mission San Juan Bautista, San Miguel Arcangel and Mission San Rafael is assembled from panels 242 and 243. Panel 242 includes end panel 244, elongated side panel 245 and locking tabs 246, 248. Upward pointing locking tab 246, which is joined to end panel 244, is folded toward the inside facing surface of panel 244 along fold line 247. Tab slot 246a is located in the gap between locking tab 246 and end panel 0.244. Panel 242 also includes downward locking tab 248, which is joined to a portion of panel 245 along fold line 249. Locking tab slot 248a is located in the space between locking tab 248 and side panel 245. Locking tab 248 is folded toward the inside surface of panel 242 along fold line 249. Panel 244, which is joined to panel 245 along fold line 250, is folded toward the inside facing surface of panel 245 along fold line 250. Side edge flange tab 251, which is joined to the bottom edge of elongated side panel 245, is folded up and toward the inside facing surface of panel 245 along fold line 252. End edge flange tab 253, which is joined to the bottom edge of end panel 244 along fold line 253a, is folded up and toward the inside facing surface of panel 244. Side panel 245 also includes at least one cut out portion that forms an opening. Roof panel 254, which is joined to the top edge of side panel 245, is folded downward and toward the inside facing surface of panel 245 along fold line 255. FIG. 8A shows an illustrative embodiment of the present invention, where side panel 245 includes five sections 256a–256e, which have been cut-out to form openings in side wall panel 245.

FIG. 8B depicts panel 243, which includes end panel 257, elongated side panel 258, upward facing locking tab 259 and downward facing locking tab 260. Upward locking tab 259, which is joined to a lower portion of the edge of end panel 257, is folded toward the inside surface of panel 257 along fold line 261. The space between locking tab 259 and end panel 257 creates tab insert slot 261a. Downward facing locking tab 260, which is joined to an upper portion of side panel 258, is folded toward the inside surface of panel 258 along fold line 262. The space created between locking tab 260 and side panel 258 is an insert tab slot 262a. Flange panel 264, which is joined to the bottom portion of side panel 258, is folded up and toward the inside facing surface of panel 258 along fold line 265. Flange panel 266, which is joined to the bottom edge of end panel 257, is folded up and toward the inside facing surface of panel 257 is folded along fold line 267. Top portion 268 of end panel 257 includes sloping edges 269, 270 that terminate into point 271. Roof panel 272, which is joined to the top edge of side panel 258, is folded down and toward the inside surface of panel 258 along fold line 273. Panels 242, 243 are then connected to form the living quarters of the model. Upward facing locking tab 246 of panel 242 is inserted into tab slot 262a of panel 243 and downward facing locking tab 260 is inserted into tab slot 246a of panel 242. Panels 244, 245, 257, 258 are then squared-up. Upward facing locking tab 259 of panel 243 is inserted into tab slot 248a of panel 242 and downward facing locking tab 248 is inserted into tab slot 261a of panel 243. Top edge 254a of roof panel 254 and top edge 272a of roof panel 272 are then folded toward the longitudinal middle of the living quarters until edge 254a and 272a are in substantial contact along their entire lengths. End edge 254b of roof panel 254 should now be in substantial contact with the sloping edge 244a of end panel 244, and end edge 254c of roof panel 244 should now be in substantial contact with the sloping edge 270 of end panel 257. End edge 272b of roof panel 257 should now be in substantial contact with the sloping edge 269 of end panel 257, and end edge 272c of roof panel 272 should now be in substantial contact with the sloping edge 244b of end panel 244. Flange tabs 251, 253, 260, 264 are adapted to be placed in contact with the top surface of the base mounting member of the model and provides support and stability to the model of the living quarters.

The models of Missions San Diego and San Juan Bautista also include a model campananrio that is placed in contact with a portion of an upright wall of the model building structure of the present invention. Panel 184 is folded to form the campanario portion of the building model of the present invention. Panel 184 includes panels 185, 186, which are divided into separate sections along fold line 187. Each of panels 185, 186 also include opposite facing inside and outside surfaces. Panels 185, 186 are folded along fold line 187 in a back to back manner, such that the inside facing surfaces of panels 185, 186 are in contact with each other.

Flange panel 188, which is joined to the bottom edge of panel 185 along fold line 190, is folded up and toward the outside facing surface of 185. Wall flange panel 189, which is joined to a lower portion of an upright side edge of panel 185, is folded toward the outside facing surface of panel 186 along fold line 191. FIG. 5 shows an illustrative embodiment, wherein each of panels 185, 186 have five cut out portions 194a–194e, 195a–195e. Wall flange tab 189 is adapted to be positioned in contact with a portion of an upright side of the building structure. Wall flange tab 189 can be merely placed in contact with a portion of an upright side of the building structure or, alternatively, wall flange member can be fixedly or releasably attached to a portion of an upright side of the building structure with an attachment means. Flange 188 is adapted to be placed in contact with the top surface of the base mounting member to provide support for the campanario.

In another embodiment, the kit also includes pieces of foldable, self-supporting sheet material that, when assembled, form flying buttresses of the models of Missions Santa Barbara, San Jose and Soledad of the present invention. Panels 233, 235 are folded inward to ward the longitudinal midline of panel 234 along fold lines 236, 237, respectively. Tab 238, which is joined to a portion of the edge of panel 233, is folded inward along fold line 240. Tab 239, which is joined to a portion of panel 235, is folded inward along fold line 241.

The building model of Mission San Jose includes a two-story bell tower that is adapted to be positioned on the roof of the church building. Referring again to FIG. 4C, panel 273 is folded into upright panels 274, 275, 276, 277 along fold lines 281, 282, 283 to square up the two story bell tower. Downward facing locking tab 278, which is joined to a portion of panel 274, is folded along fold line 280 and inserted into locking tab slot 279a. Upward facing tab 279, which is joined to a portion of panel 277, is folded along fold line 284 and inserted into locking tab slot 278a. Flange tab members 285, 286, 287, 288, which are joined to the bottom edges of panels 274, 275, 276, 277, are folded up and inward toward the inside of the squared up bell tower along fold lines, 289, 290, 291, 292, respectively. Roof support panels 293, 295, which are joined to the top portions of panels 275, 277, are folded down and inward toward the inside of the squared up bell tower along fold lines 296, 298, respectively. Roof panel 294, which is joined to the top edge of panel 276, is folded down and toward the tope edge of panel 274 along fold line 300. Tuck portion 299 of panel 294 is folded down along fold line 300 and is inserted in the space between the inner surface of panel 274 and the edges of roof panels 293, 295, which is created by the notched edges of roof support panels 293, 295. Panels 274, 275, 276, 277 also include cut out portions 301–306, which represent openings in the bell tower. The bottom edge of the two-story bell tower is then inserted into cut-out portion 110 of roof panel 92 to complete the assembly of the model of Mission San Jose.

In another embodiment, the kit includes panel 120 that, when assembled, forms a large bell tower that is adapted to be positioned or disposed on the roof of model building structure 20. Again referring to FIG. 4A, panel 120 includes panels 121, 122, 123, 124. Panel 120 is squared up by folding panels 121, 122, 123, 124 along fold lines 127, 128, 129. Downward locking tab 125, which is joined to a portion of panel 121, is folded inward along fold line 130 and inserted into locking tab slot 126a. Upward locking tab 126, which is joined to a portion of panel 124, is folded along fold line 131 and is inserted into locking tab slot 125a Flanges panels 132, 133, 134 and 135, which are joined to the bottom edges of panels 121, 122, 123, 124 are folded up and inward toward the middle of the large bell tower along fold lines, 136, 137, 138, 139, respectively. Cut out portions, 152, 153, 154, 155 are cut-out to form openings in the bell tower to give the appearance of windows. Roof support panels 140, 142, which are joined to the top edge of panels 122, 124, respectively, are folded down and inward toward the inside of the large bell tower along fold lines 143, 145. Roof panel 141 is folded down fold line 144 and over folded down roof panels 140, 142. Tuck tab portion 141a of roof panel 141 is folded down along fold line 141b and is inserted into the notched space created between the inner surface of panel 123 and notches 140a, 142a of notched roof panels 140, 142. Cut-out sections 152–155 are cut-out to form the open windows of the large bell tower.

In another embodiment, roof panel 141 and roof support panels 140, 142 are provided with a cut out sections 146, 147, 148, 149, 150, 151 that are adapted to be insert slots for receiving an insert tab member of a small bell tower. According to this embodiment, the kit also contains a sheet of foldable, self-supporting sheet material 155 that, when assembled, forms a bell tower that is smaller, in at least one of the length and width, than the large bell tower formed by folding panel 120. Roof panel 141 has four cut out sections 148, 149, 150, 151 that form insert slots for a tab members of a bell tower that is smaller in length and width. Panels 140, 142 are provided with cut out sections 146, 147 that are adapted to be an insert slot for a tab member of the small bell tower. According to this embodiment, the large bell tower is assembled from panel 120 and then the smaller bell tower is assembled from panel 156 and positioned on roof panel 141 of the large bell tower. Again referring to FIG. 4B, the kit also includes panel 156 that, when folded, forms a small bell tower that is adapted to be positioned on the top portion of the large bell tower described above. Panel 156 is squared up by folding panels 157, 158, 159, 160, along fold lines 161, 162, 163. Upward tab 164, which is joined to panel 157, is folded inward along fold line 166 and is inserted into insert tab slot 165a. Downward tab 165, which is joined to a portion of panel 160, is folded inward along fold line 167 and inserted into insert slot 164a. The bottom portions of panels 157, 158, 159, 160 terminate into insert tab members 168, 169, 170, 171, respectively. Insert tab members 168, 169, 170, 171 are adapted to be inserted into insert slots 148, 149, 150, 151 of the top panel 141 of the large bell tower. Roof support panels 172, 174, which are joined to the top portions of panels 157, 159 respectively, are folded down and toward the inside of the squared-up bell tower along fold lines 175, 177. Roof panel 173 is folded down along fold line 176 and over roof support panels 172, 174. Tuck portion 178 of roof panel 173 is folded down along fold line 179 and is inserted in the space between the inner surface of panel 160 and angled edges 172a, 174a of roof support panels 172, 174. Panels 157, 158, 159, 160 also include cut out portions 180, 181, 182, 183, which are cut-out to represent openings or windows in the small bell tower. Insert tab members 168, 169, 170, 171 of the small bell tower are then inserted to insert slots 148, 149, 150, 151 of the roof panel 141 of the large bell tower to form a two-tiered bell tower. To complete the assembly of the model of Mission Santa Barbara, a two-tiered bell tower is positioned within cut-out sections 103, 104 of roof tile panel 91.

Once the model building structure has been assembled, the building can be further decorated. The assembler may utilize any type of arts and crafts supplies to decorate the exterior of the model building structure to give it the appearance of one of the famous California Fransican Missions. Suitable arts and crafts supplies includes, but is not limited to, colored construction papers, colored pencils, colored markers, paints, shaped styrofoam, such as styrofoam spheres, balsa wood, artificial tress, bushes and shrubs for landscaping.

Therefore, the present invention provides an model of a building structure and a model kit containing all of the necessary materials to assemble the model building structure. The kit can be used in teaching about the history of the California mission program. The kit of the present invention can be manufactured for 100% recyclable and non-polluting materials. It should be understood that the present invention is not limited to the specific embodiments described above, but includes the variations, modifications and equivalent embodiments that are defined by the following claims.

I claim:

1. A model kit for the assembly of a model comprising:
   a flexible waterproof package containing:
      a substantially planar base mounting member comprised of self-supporting sheet material and having opposite top and bottom surfaces;
      a first piece of foldable, self-supporting sheet material, said first piece of foldable, self-supporting sheet material having fold lines thereon, and when folded along said fold lines forms a first building structure, said first building structure adapted to be mounted directly on a portion of said top surface of said base mounting member; and
      a second piece of foldable, self-supporting sheet material, said second piece of foldable, self-supporting sheet material having fold lines thereon, and when folded along said fold lines forms a second building structure that is adapted to be mounted directly on a portion of said top surface of said base mounting member; and
   wherein said kit further comprises an educational quiz.

2. The model kit of claim 1, wherein said model kit further includes a third piece of foldable, self-supporting sheet material, said third piece of self-supporting sheet material having fold lines thereon and when folded along said fold lines forms a roof tile of said first building structure, and a fourth piece of foldable, self-supporting sheet material, said fourth piece of self-supporting sheet material having fold lines thereon and when folded along said fold lines forms a roof tile of said second building structure.

3. The model kit of claim 2, wherein said model kit further includes a fifth piece of foldable, self-supporting sheet material, said fifth piece of self-supporting sheet material having fold lines thereon, and when folded along said fold lines forms a bell tower that is adapted to be inserted into a portion of said roof of said building structure.

4. The model kit of claim 3, wherein said model kit further includes an eighth piece of foldable, self-supporting sheet material, said eighth piece of self-supporting sheet material having fold lines thereon and when folded along said fold lines forms a flying buttress.

5. The model kit of claim 3, wherein said model kit further includes an eleventh piece of foldable, self-supporting sheet material, said eleventh piece of self-supporting sheet material having fold lines thereon and when folded along said fold lines forms a campanario.

6. The model kit of claim 2, wherein said model kit further includes (i) a sixth piece of foldable, self-supporting sheet material, said sixth piece of self-supporting sheet material having fold lines thereon and when folded along said fold lines forms at least one first bell tower that is adapted to be inserted into a portion of said roof of said building structure and (ii) a seventh piece of foldable, self-supporting sheet material, said seventh piece of self-supporting sheet material having fold lines thereon and when folded along said fold lines forms at least one second bell tower that is adapted to be inserted into a portion of said first bell tower.

7. The model kit of claim 6, wherein said model kit further includes a ninth piece of foldable, self-supporting sheet material, said ninth piece of self-supporting sheet material having fold lines thereon and when folded along said fold lines forms a flying buttress.

8. The model kit of claim 7, wherein said model kit further includes a twelfth piece of foldable, self-supporting sheet material, said twelfth piece of self-supporting sheet material having fold lines thereon and when folded along said fold lines forms a campanario.

9. The model kit of claim 1, wherein said model kit further includes a tenth piece of foldable, self-supporting sheet material, said tenth piece of self-supporting sheet material having fold lines thereon and when folded along said fold lines forms a campanario.

10. The model kit of claim 1, wherein said flexible waterproof material is constructed from a polymeric material.

11. The model kit of claim 10, wherein said polymeric material is selected from the group consisting of polyethylene, polypropylene and polyvinyl chloride.

12. The model kit of claim 11, wherein said polymeric material is polyvinyl chloride.

13. The model kit of claim 11, wherein said polymeric material is polypropylene.

14. The model kit of claim 1, wherein said kit further comprises instructions for assembly of said model.

15. The model kit of claim 14, wherein said instructions are in the form of one selected from the group consisting of a plurality of instruction sheets, an instruction booklet, an instruction pamphlet and an instruction manual.

16. The model kit of claim 15, wherein said instruction are in the form of a plurality of instruction sheets.

17. The model kit of claim 1, wherein said quiz includes questions relating to the subject of mathematics.

18. The model kit of claim 1, wherein said quiz includes questions relating to the subject of geometry.

19. The model kit of claim 1, wherein the model building structure has the exterior appearance of one of the famous California Franciscan Missions selected form the group consisting of Mission San Diego, Mission Santa Barbara, Mission San Juan Bautista, Mission Carmel, Mission Soledad, Mission Solano, Mission San Jose, Mission San Rafael, Mission San Miguel Arcangel.

20. The model kit of claim 19, where said California Franciscan Mission is selected from the group consisting of Mission San Diego, Mission Santa Barbara, Mission San Juan Bautista, and Mission Carmel.

21. The model kit of claim 19, where said California Franciscan Mission is selected from the group consisting of Mission Soledad, Mission Solano, Mission San Jose, Mission San Rafael, Mission San Miguel Arcangel.

22. The model kit of claim 1, wherein said quiz includes questions relating to the subject of science.

23. The model kit of claim 1, wherein said quiz includes questions relating to the subject of history.

* * * * *